United States Patent
Mengibar et al.

(10) Patent No.: US 9,129,598 B1
(45) Date of Patent: *Sep. 8, 2015

(54) INCREASING SEMANTIC COVERAGE WITH SEMANTICALLY IRRELEVANT INSERTIONS

(71) Applicant: Google Inc., Mountain View, CA (US)

(72) Inventors: Pedro J. Moreno Mengibar, Jersey City, NJ (US); Mark Edward Epstein, Katonah, NY (US); Fadi Biadsy, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/671,353

(22) Filed: Mar. 27, 2015

Related U.S. Application Data (63) Continuation of application No. 13/780,804, filed on Feb. 28, 2013, now Pat. No. 9,020,809.

(51) Int. Cl.
| | |
|---|---|
| *G10L 15/00* | (2013.01) |
| *G10L 15/19* | (2013.01) |
| *G10L 15/06* | (2013.01) |

(52) U.S. Cl.
CPC ............... *G10L 15/063* (2013.01); *G10L 15/19* (2013.01); *G10L 2015/0631* (2013.01)

(58) Field of Classification Search
CPC ....... G06F 17/27; G06F 17/28; G10L 15/063; G10L 15/18

USPC .............................. 704/1, 2, 8, 231, 246, 257
See application file for complete search history.

(56) References Cited

U.S. PATENT DOCUMENTS

| | | | |
|---|---|---|---|
| 5,212,821 A | 5/1993 | Gorin | |
| 5,797,123 A | 8/1998 | Chou | |
| 9,020,809 B1 * | 4/2015 | Mengibar et al. | 704/9 |
| 2006/0190261 A1 | 8/2006 | Wang | |
| 2012/0290509 A1 | 11/2012 | Heck | |

* cited by examiner

*Primary Examiner* — Thierry L Pham
(74) *Attorney, Agent, or Firm* — Fish & Richardson P.C.

(57) ABSTRACT

A method includes accessing data specifying a set of actions, each action defining a user device operation and for each action: accessing a corresponding set of command sentences for the action, determining first n-grams in the set of command sentences that are semantically relevant for the action, determining second n-grams in the set of command sentences that are semantically irrelevant for the action, generating a training set of command sentences from the corresponding set of command sentences, the generating the training set of command sentences including removing each second n-gram from each sentence in the corresponding set of command sentences for the action, and generating a command model from the training set of command sentences configured to generate an action score for the action for an input sentence based on: first n-grams for the action, and second n-grams for the action that are also second n-grams for all other actions.

19 Claims, 4 Drawing Sheets

INCREASING SEMANTIC COVERAGE WITH SEMANTICALLY IRRELEVANT INSERTIONS

CROSS-REFERENCE TO RELATED APPLICATIONS

This application is a continuation application of, and claims priority to, U.S. patent application Ser. No. 13/780,804, titled "Increasing Semantic Coverage With Semantically Irrelevant Insertions," filed on Feb. 28, 2013. The disclosure of the foregoing application is incorporated herein by reference in its entirety for all purposes.

BACKGROUND

This specification relates to speech recognition and speech understanding systems.

Speech recognition and speech processing systems are prevalent in many consumer electronic devices. Many of these electronic devices now utilize speech command processing techniques to invoke and perform particular operations. For example, a user device, such as a smart phone, can process speech commands to perform specified operations that include searching the web, setting an alarm, calling a particular person, and so on.

A user device uses a speech recognition processing system to recognize and process speech commands. A provider of the speech recognition and processing system trains the system on examples of the various commands he/she will speak. The training of the speech recognition and processing system is resource intensive.

SUMMARY

In general, one innovative aspect of the subject matter described in this specification can be embodied in methods that include the actions of accessing data specifying a set of actions, each action defining a user device operation that is different from user device operations for each other action; for each action, accessing a corresponding set of command sentences for the action; for each action, determining first n-grams in the set of command sentences that are semantically relevant for the action; for each action, determining second n-grams in the set of command sentences that are semantically irrelevant for the action; for each action, generating a training set of command sentences from the corresponding set of command sentences, the generating the training set of command sentences including removing each second n-gram from each sentence in the corresponding set of command sentences for the action; and for each action, generating or updating a command model from the training set of command sentences and persisting the command model in a computer memory device, the command model that facilitates the generation of an action score for the action for an input sentence based on: first n-grams for the action, and second n-grams for the action that are also second n-grams for all other actions. Other embodiments of this aspect include corresponding systems, apparatus, and computer programs, configured to perform the actions of the methods, encoded on computer storage devices.

Another innovative aspect of the subject matter described in this specification can be embodied in methods that include the actions of receiving, by a user device, for each action of set of actions, a command model for the action, each command model based on a respective training set of command sentences generated from command sentences from which second n-grams that are determined to be semantically irrelevant for the action has been removed, the command model that facilitates the generation of an action score for the action for an input sentence based on: first n-grams for the action that have been determined to be semantically relevant for the action; and second n-grams for the action that are also second n-grams for all other actions; receiving, by the user device, an input sentence of n-grams; applying the command models to the input sentence of n-grams to generate respective action scores; determining, from the command models, an action invoked by the input sentence based on the respective action scores, the action being one of the actions in the set of actions; and performing the action by the user device. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The training data for each action is kernalized to include only the semantically relevant n-grams for the action, and semantically irrelevant n-grams are removed from the training data. The training data are used to build a command model for each action. At run time, e.g., when processing a voice command on a user device, n-grams that are semantically irrelevant to the action and other actions can be freely inserted when scoring a candidate speech command. This allows designers of semantic language models to obtain broad coverage, that is with just a relative small number of examples, multiple possible phrases can be parsed correctly.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A system learns from a set of command sentences for a set of actions terms and phrases that are semantically irrelevant to each action in the set of actions, and also learns, for each action, words and phrases that are semantically relevant to the action. Training data for each specific action is then "kernalized" to just include the semantically relevant words and phrases in the training data for the action. A command model for the action is trained from the training data, and at run time, the phrases and words that are found to be irrelevant for an action and also irrelevant to other actions can then be inserted when applying the model to an input sentence of n-grams.

Figure 1:
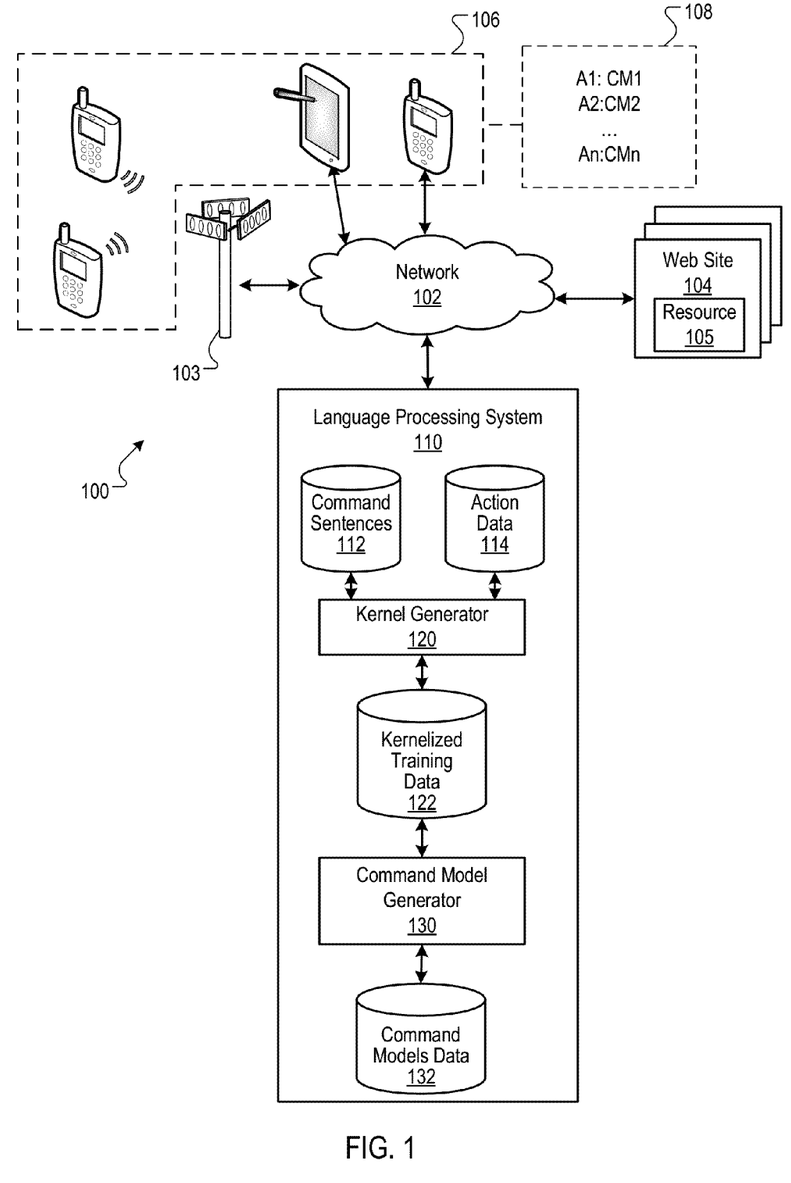
FIG. 1 is a block diagram of an environment in which the command models for corresponding actions are utilized.

FIG. 1 is a block diagram of an environment in which the command models for corresponding actions are utilized. A computer network 102, such as a local area network (LAN), wide area network (WAN), the Internet, or a combination thereof, provides for data communication between electronic devices and systems. Examples of such electronic device and systems include web sites 104 and user devices 106. The computer network 102 may also be included, or be in data communication with, one or more wireless networks 103.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a content publisher, which is an entity that controls, manages and/or owns the website 104. A resource 105 is any data that can be provided by the website 104 over the network 102 and that is associated with a resource address.

A user device 106 is an electronic device that is under the control of a user and is capable of requesting and receiving resources over the network 102, establishing communication channels, e.g., voice communications, with other user devices 106, and also capable of performing other actions. Example user devices 106 include personal computers, mobile communication devices, and other devices that can send and receive data over the network 102. An example mobile user device 106, such as a smart phone, is described with reference to FIG. 5 below. The user devices 105 may communicate over the networks 102 and 103 by means of wired and wireless connections with the networks 102 and 103.

As described with reference to FIG. 5, a user device may be able to perform a set of device actions for various programs and capabilities. The actions may differ from each other for each action. For example, a telephone functionality may include the action placing a call in response to the commands of "call" or "phone," a particular contact, and may also include the action of "texting" the particular contact in response to the commands to "text" or "message" the particular contact; a calendar application may include the actions of "scheduling" a meeting or reminder in response to the command of "schedule," "accepting" or "declining" an invitation in response to the command to "accept" or "decline," the invitation; a mapping service may include the actions of "mapping" a location in response to the command to "map" a location; and so on. In some implementations, the user device 106 utilizes a voice recognition system that receives voice input, performs language recognition processing, and parses the resulting recognized words and phrases. The parsed words and phrases, which are referred to as n-grams, where each n-gram may constitute one or more words, are then processed to determine whether the voice input invokes a particular action. As will be described in more detail below, each action A1, A2 . . . An has a corresponding command model CM1, CM2 . . . CMn, as indicated by the phantom box 108. The user device 106 utilizes the command models CMx to determine which, if any, actions are invoked in response to a voice input. The command models may be statistical-based, e.g., weights assigned to particular words and phrases that are determined to be semantically relevant to a particular command, or rule-based, e.g., grammars that describe sentence structures for particular commands.

In some implementations, a language processing system 110 is used to generate command models data 132 that associates actions with corresponding command models. The command models data 132 store command models for actions that are respectively trained on kernalized training data that includes only the semantically relevant words and phrases in the training data for the action. The command models data 132 store command models that are each configured to generate an action score for an action for an input sentence based on semantically relevant words and phrases for the action and semantically irrelevant words and phrases for the action that are also semantically irrelevant for all other actions.

An example language processing system 110 includes a kernel generator 120 and a command model generator 130. The example architecture is illustrative only, and other appropriate functional architectures can also be used. The language processing system 110 learns, from a set of command sentences for a set of actions, terms and phrases that are semantically relevant for each action in the set of actions, and also learns, for each action, words and phrases that are semantically relevant to the action. The words and phrases that are semantically relevant to an action are referred to as "first n-grams," and the words and phrases that are semantically irrelevant to the action are referred to as "second n-grams."

After the first and second n-grams for actions are learned, training data for each specific action is then "kernalized" to just include the semantically relevant words and phrases in the training data for the action. A command model for the action is trained from the training data, and at run time, the phrases and words that are found to be semantically irrelevant for an action and also semantically irrelevant to other actions can then be inserted when applying the model to an input sentence of n-grams.

To generate the training data, the system learns which words are semantically irrelevant across a large set of command sentences, and which words are relevant to a specific command. A variety of appropriate algorithms can be used to learn the semantically irrelevant and semantically relevant n-grams. Examples include support vector machines and mutual information. After learning the first n-grams for specific action and the second n-grams, then for each action training data that includes only the semantically relevant first n-grams for the action are generated.

For each action, a command model is then built for the action using the training data for the action. The command model may be statistical-based or rule-based. The command models are then provided to user devices. At run time, when an input sentence needs to be understood at a user device, the command models allow the insertion of words and phrases that are semantically irrelevant for a specific action, provided the insertions are not also semantically relevant for another action (i.e., provided the words and phrases that are inserted with the first n-grams for action of the command model are not first n-grams for other actions of other command models). In some implementations, the "insertable" words and phrases can be specified for each action, and the number of words/phrases that can be inserted at the beginning, middle or end of an input sentence can be independently tuned.

The language processing system 110 accesses command sentences 112 and action data 114 to build command models that are then provided to user devices. One example process for generating command models is described with reference to FIG. 2, which is a flow diagram of an example process 200 for generating command models. Operation of the language processing system 110 of FIG. 1 is thus described with reference to the example process 200 of FIG. 2. The language processing system 110 can be implemented in a data processing apparatus that includes one or more networked computers that are configured to perform the operations described below.

Figure 2:
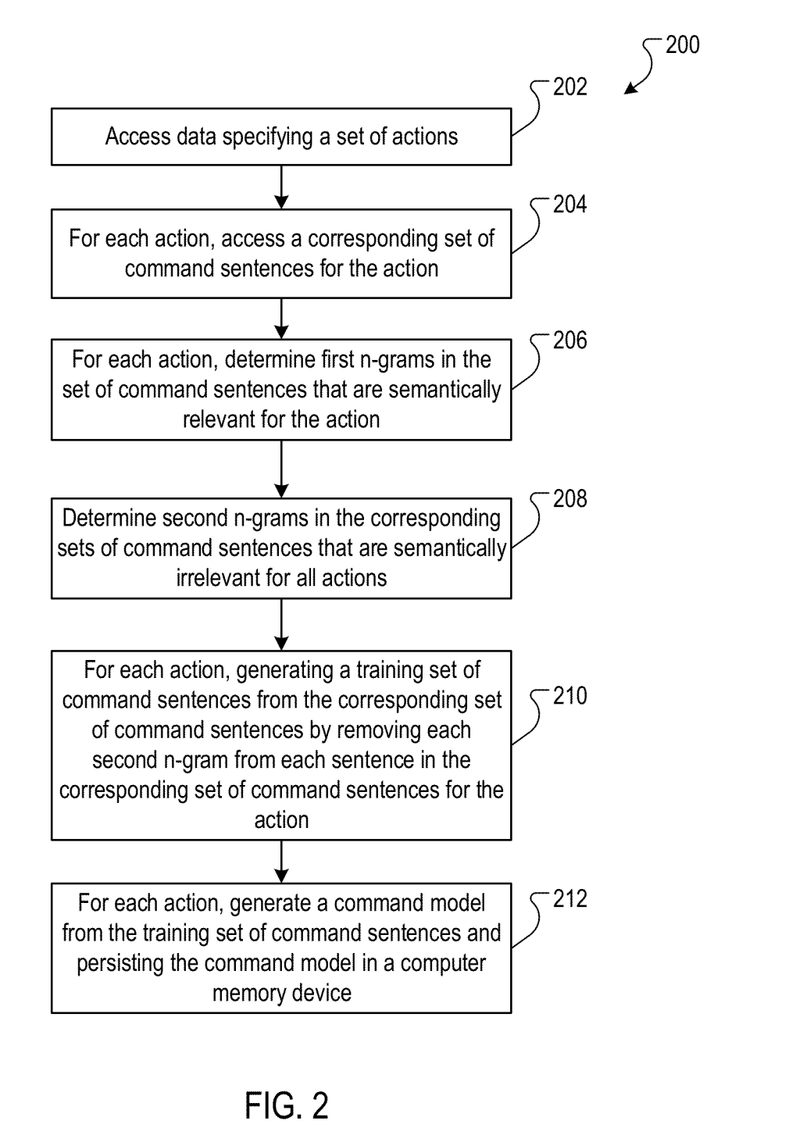
FIG. 2 is a flow diagram of an example process for generating command models.

The language processing system 110 accesses data specifying a set of actions (202). For example, the kernel generator 120 may access action data 114 that specifies particular actions for various applications. Each action defines user device operation that is different from user device operations for each other action. Example actions include a "call" action that places a phone call to a contact; a "text" action that sends a text message to a contact; a "map" action that maps a location; an "e-mail" action that sends an e-mail to a contact; and so on.

For each action, the language processing system 110 accesses a corresponding set of command sentences for the action (204). For example, the kernel generator 120 may access command sentences data 112. The command sentences data 112 may include voice commands that have been identified for the particular actions. For example, for the "call" action, the command sentences data 112 may associate a set of voice command inputs for the call action. The voice command inputs may be audio records of the uttered sentences, or, alternatively, may be the words and phrases determined from such voice command inputs.

For each action, the language processing system determines first n-grams in the set of command sentences that are semantically relevant for the action (206) and second n-grams in the corresponding set of command sentences that are semantically irrelevant for the action (208). For example, the kernel generator 120, for each of the respective sets of command sentences, determines which n-grams are semantically relevant for each respective action and semantically irrelevant of each respective action. A variety of appropriate algorithms can be used to determine the semantic relevance of an n-gram. Examples of such algorithms include mutual information, support vector machine classifiers, and neural net classifiers. The algorithm can be implemented in the kernel generator 120. For a support vector machine, the kernel generator 120 determines whether the n-gram is a first n-gram or a second n-gram by classifying the n-gram according to a support vector model that has been trained to classify n-grams as being relevant or irrelevant to particular actions. For mutual information, the n-grams with the relatively highest point wise mutual information (PMI) scores can be classified as first n-grams, while the n-grams with the relative lowest PMI scores can be classified as second n-grams. Other appropriate language relevance determination processes can also be used.

For each action, the language processing system 110 generates a training set of command sentences from the corresponding set of command sentences by removing each second n-gram from each sentence in the corresponding set of command sentences for the action (210). For example, the kernel generator 120 may, in some implementations, retain only first n-grams in each of the command sentences for each respective action, i.e., removing each n-gram from each sentence in the corresponding set of command sentences for the action that is not a first n-gram for the action. To illustrate, for the following sentence for a "call" action:

I need to call Page now assume the kernel generator 120 identifies "call" and "Page" as semantically relevant (the latter term being relevant because the kernel generator 120 identifies the term as a contact associated with a call action), and all other n-grams semantically irrelevant. The resulting sentence is:

call Page

Alternatively, the sentence can be parameterized to:

call <phone contact>

For each action, the language modeling system 110 generates a command model from the training set of command sentences and persists the command model in a computer memory device (212). The command model facilitates the generation of an action score for the action for an input sentence based on first n-grams for the action and second n-grams for the action that are also second n-grams for all other actions. In some implementations, a command model generator 130 can generate grammar rule models based on grammars that are configured to parse to input sentences. In other implementations, the command model generator 130 can generate statistical models that scores an input sentence based on n-gram statistics. Other appropriate command models can also be generated.

After the command models are generated, they are persisted to command model data 132. The command model data 132 can, for example, be provided to user devices 106 to perform natural language voice processing of voice command sentences.

Figure 3:
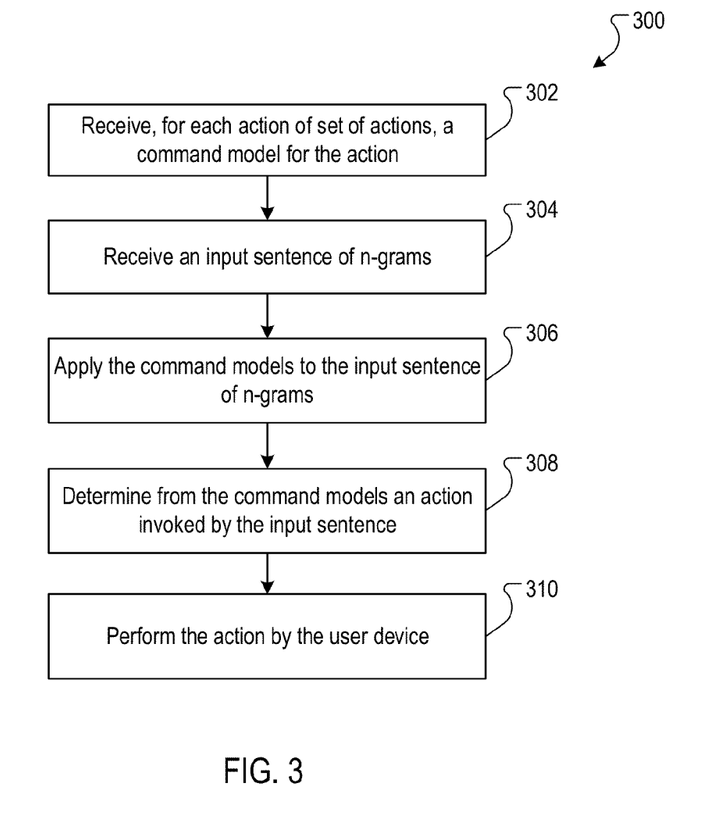
FIG. 3 is a flow diagram of an example process for processing an input command using command models.

FIG. 3 is a flow diagram of an example process 300 for processing an input command using command models. The process 300 can be implemented in a user device, such as the user device 510 of FIG. 5.

The user device 510 receives, for each action or set of actions, a command model for the action (302). Each command model is based on a respective training set of command sentences generated from command sentences from which second n-grams that are determined to be semantically irrelevant for the action has been removed. The command models are each configured to generate an action score for the action for an input sentence based on first n-grams for the action that have been determined to be semantically relevant for the action, and second n-grams for the action that are also second n-grams for all other actions. Alternatively, the command models are each configured to generate an action score for the action for an input sentence based on first n-grams for the action that have been determined to be semantically relevant for the action, and any n-grams that are not first n-grams for the action nor any other actions.

The user device 510 receives an input sentence of n-grams (304). For example, a user of the user device may speak a voice command that may invoke a particular action. The voice data is processed to generate language text of n-grams that can be parsed and scored by the command models 132.

The user device 510 applies the command models to the input sentence of n-grams to generate respective action scores (306). For each command model for each action, the user device, using the data provided in the command models 132, identifies insertion n-grams. Insertion n-grams are second n-grams that are semantically irrelevant for the action and semantically irrelevant for all other actions. Alternatively, insertion n-grams are not necessarily second n-grams for all other actions. Instead, insertion n-grams may be second n-grams that are not identified as first n-grams for the action and that have not been identified as first n-grams for any other actions. For example, assume the following voice command is received:

Text Julia please call me asap

For the "call" action, the second n-grams that are semantically irrelevant to the "call" action are "text," "please," "me," and "asap." However, the "text" n-gram is a first n-gram that is semantically relevant for the "text" action. Accordingly, a score for the call action is generated based on the following input sentence to the model for the call action:

Text Julia <insertion> call <insertion> <insertion>

Likewise, for the "text" action, the second n-grams that are semantically irrelevant to the "text" action are "call," "please," "me," and "asap." However, the "call" n-gram is a first n-gram that is semantically relevant for the "call" action. Accordingly, a score for the text action is generated based on the following input sentence to the model for the call action:

Text Julia <insertion> call <insertion> <insertion>

The command models can be configured to generate, or facilitate the generation of, a score according to any appropriate scoring algorithm. For example, the command model may be context-free grammars of the form V→w, where V is a single nonterminal symbol, and w is a string of terminals and/or nonterminals. Each action may have one or more grammars of one or more nonterminals. The nonterminals may correspond to first n-grams for the action, and second n-grams for all actions and/or n-grams that are not first n-grams for the action or any other action. The scoring may be based on the accuracy of the resulting parse tree.

By way of another example, the command model may be based on n-gram statistics. For example, statistics such as the number of insertions, per-model weights of the first n-grams in the input sentence, and the like may be used to generate the model score.

The user device 510 determines, from the command models, an action invoked by the input sentence based on the respective action scores (308). For example, for the above sentences, assume the "text" action receives a higher score than the "call" action based on the applied models. This can be based on, for example, a "text" action command and a "call" action command being of the general forms, respectively:

<text invocation> <text contact> <message data>
<call invocation><call contact>

Being as the message "Text Julia <insertion> call <insertion> <insertion>" is of the general form <text invocation [Text]> <text contact [Julia]}> <message data [<insertion> call <insertion> <insertion>], the text command model will generate a higher score than the call command model. For example, the text-related grammars may provide a more accurate parse of the input sentence than call-related grammars; or a statistical model for a text action may provide a higher likelihood than a statistical model for a call action.

The user device performs the action (310). For example, the user device will send a text message to the "Page" contact with the body "please call me asap."

Figure 4:
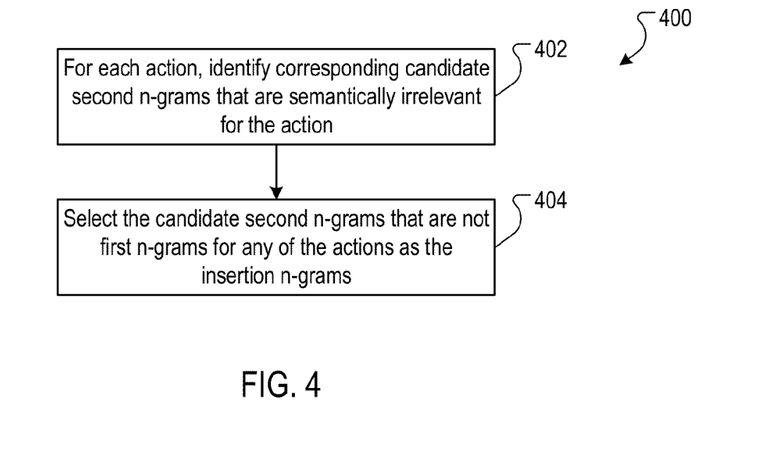
FIG. 4 is a flow diagram of an example process for determining insertion n-grams.

As described above, insertion n-grams for a particular action are second n-grams that are semantically irrelevant for the action and semantically irrelevant for all other actions, or, alternatively, second n-grams that are semantically irrelevant for the action and that have not been identified as first n-grams for any other actions. FIG. 4 is a flow diagram of an example process 400 for determining insertion n-grams. The process 400 can be implemented in a user device, such as the user device 510 of FIG. 5.

The user device 510 identifies, for each action, corresponding candidate second n-grams that are semantically irrelevant for the action (402). For example, as described above, for the input voice command "Text Page please call me asap," the second n-grams that are semantically irrelevant to the "text" action are "call," "please," "me," and "asap." Likewise, the second n-grams that are semantically irrelevant to the "call" action are "text," "please," "me," and "asap."

The user device 510 selects the candidate second n-grams that are not first n-grams for any of the actions as the insertion n-grams (404). For example, the second n-grams "please," "me," and "asap" are selected as insertion n-grams, while the second n-gram "text" for the "call" action and the second n-gram "call" for the "text" action are not selected as insertion n-grams.

Variations of the examples described above can also be implemented. For example, while n-grams have been described in the context of single words, or multiple words or phrase, the n-grams can also be lexical units. For English, a lexical unit may be a word, a prefix, a stem, or even a suffix. For languages that use ideographic writing systems, e.g., Japanese and Chinese, a lexical unit may be a pictographic character, e.g. Kangii, Katakana, Hirigana characters. For example, the system might learn that a word stem is semantically relevant and include it in the first n-grams. However, the prefix and suffix might be determined to belong to the second set of n-grams, thus allowing generalizations of sentences from one verb form to another, or singular nouns to plural nouns, etc.

Figure 5:
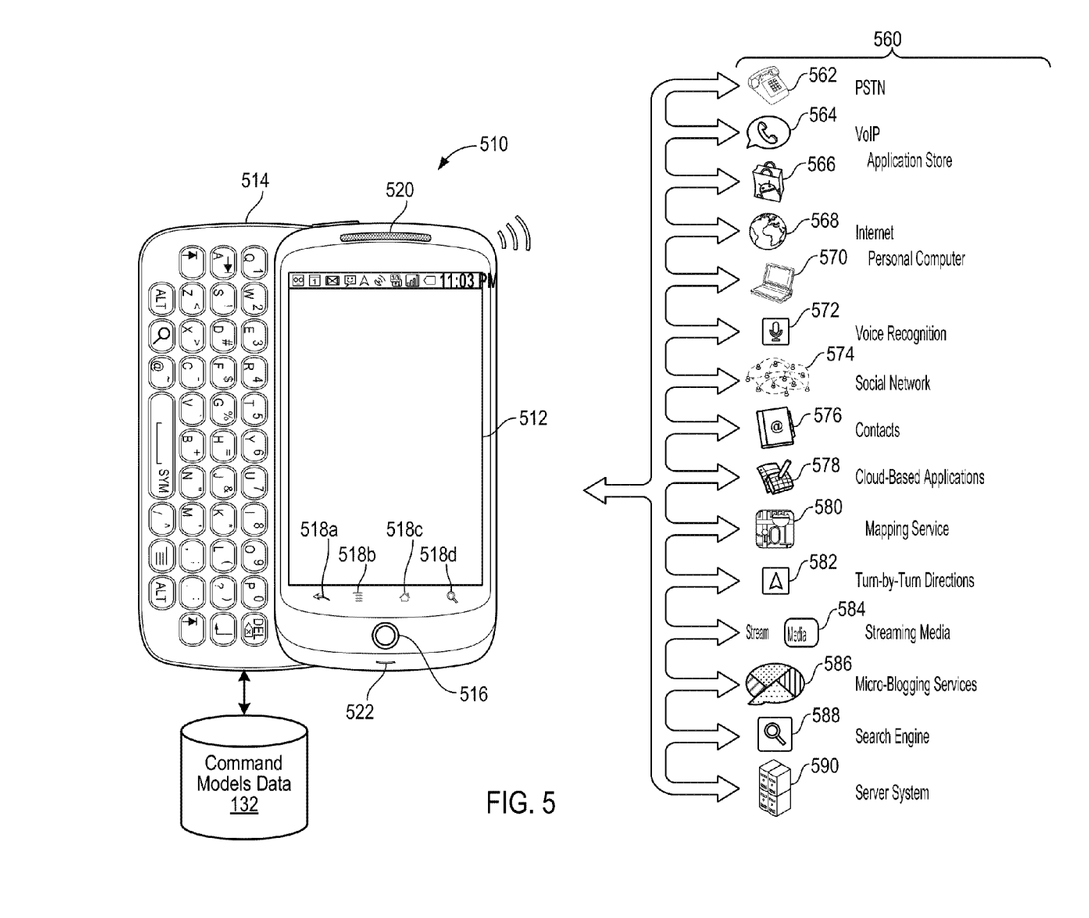
FIG. 5 is a block diagram of an example mobile computing device.

FIG. 5 is a block diagram of example mobile computing device. In this illustration, the mobile computing device 510 is depicted as a handheld mobile telephone (e.g., a smartphone, or an application telephone) that includes a touchscreen display device 512 for presenting content to a user of the mobile computing device 510 and receiving touch-based user inputs. Other visual, tactile, and auditory output components may also be provided (e.g., LED lights, a vibrating mechanism for tactile output, or a speaker for providing tonal, voice-generated, or recorded output), as may various different input components (e.g., keyboard 514, physical buttons, trackballs, accelerometers, gyroscopes, and magnetometers).

Example visual output mechanism in the form of display device 512 may take the form of a display with resistive or capacitive touch capabilities. The display device may be for displaying video, graphics, images, and text, and for coordinating user touch input locations with the location of displayed information so that the device 510 can associate user contact at a location of a displayed item with the item. The mobile computing device 510 may also take alternative forms, including as a laptop computer, a tablet or slate computer, a personal digital assistant, an embedded system (e.g., a car navigation system), a desktop personal computer, or a computerized workstation.

An example mechanism for receiving user-input includes keyboard 514, which may be a full qwerty keyboard or a traditional keypad that includes keys for the digits '0-9', '*', and '#.' The keyboard 514 receives input when a user physically contacts or depresses a keyboard key. User manipulation of a trackball 516 or interaction with a track pad enables the user to supply directional and rate of movement information to the mobile computing device 510 (e.g., to manipulate a position of a cursor on the display device 512).

The mobile computing device 510 may be able to determine a position of physical contact with the touchscreen display device 512 (e.g., a position of contact by a finger or a stylus). Using the touchscreen 512, various "virtual" input mechanisms may be produced, where a user interacts with a graphical user interface element depicted on the touchscreen 512 by contacting the graphical user interface element. An example of a "virtual" input mechanism is a "software keyboard," where a keyboard is displayed on the touchscreen and a user selects keys by pressing a region of the touchscreen 512 that corresponds to each key.

The mobile computing device 510 may include mechanical or touch sensitive buttons 518a-d. Additionally, the mobile computing device may include buttons for adjusting volume output by the one or more speakers 520, and a button for turning the mobile computing device on or off. A microphone 522 allows the mobile computing device 510 to convert audible sounds into an electrical signal that may be digitally encoded and stored in computer-readable memory, or transmitted to another computing device. The mobile computing device 510 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. The operating system may provide a platform for the execution of application programs that facilitate interaction between the computing device and a user.

The mobile computing device 510 may present a graphical user interface with the touchscreen 512. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 504. User-selection of the button may invoke the pre-defined action.

The mobile computing device 510 may include other applications, computing sub-systems, and hardware. A voice recognition service 572 may receive voice communication data received by the mobile computing device's microphone 522, and translate the voice communication into corresponding textual data or perform voice recognition. The processed voice data can be input to the command models stored in the command models data 132 to determine whether the voice input used to generate the voice data invokes a particular action for a particular application as described above. One or more of the applications, services and units below may have corresponding actions invoked by such voice commands.

A call handling unit may receive an indication of an incoming telephone call and provide a user the capability to answer the incoming telephone call. A media player may allow a user to listen to music or play movies that are stored in local memory of the mobile computing device 510. The mobile device 510 may include a digital camera sensor, and corresponding image and video capture and editing software. An internet browser may enable the user to view content from a web page by typing in an addresses corresponding to the web page or selecting a link to the web page.

A service provider that operates the network of base stations may connect the mobile computing device 510 to the network 550 to enable communication between the mobile computing device 510 and other computing systems that provide services 560. Although the services 560 may be provided over different networks (e.g., the service provider's internal network, the Public Switched Telephone Network, and the Internet), network 550 is illustrated as a single network. The service provider may operate a server system 552 that routes information packets and voice data between the mobile computing device 510 and computing systems associated with the services 560.

The network 550 may connect the mobile computing device 510 to the Public Switched Telephone Network (PSTN) 562 in order to establish voice or fax communication between the mobile computing device 510 and another computing device. For example, the service provider server system 552 may receive an indication from the PSTN 562 of an incoming call for the mobile computing device 510. Conversely, the mobile computing device 510 may send a communication to the service provider server system 552 initiating a telephone call using a telephone number that is associated with a device accessible through the PSTN 562.

The network 550 may connect the mobile computing device 510 with a Voice over Internet Protocol (VoIP) service 564 that routes voice communications over an IP network, as opposed to the PSTN. For example, a user of the mobile computing device 510 may invoke a VoIP application and initiate a call using the program. The service provider server system 552 may forward voice data from the call to a VoIP service, which may route the call over the internet to a corresponding computing device, potentially using the PSTN for a final leg of the connection.

An application store 566 may provide a user of the mobile computing device 510 the ability to browse a list of remotely stored application programs that the user may download over the network 550 and install on the mobile computing device 510. The application store 566 may serve as a repository of applications developed by third-party application developers. An application program that is installed on the mobile computing device 510 may be able to communicate over the network 550 with server systems that are designated for the application program. For example, a VoIP application program may be downloaded from the Application Store 566, enabling the user to communicate with the VoIP service 564.

The mobile computing device 510 may access content on the internet 568 through network 550. For example, a user of the mobile computing device 510 may invoke a web browser application that requests data from remote computing devices that are accessible at designated universal resource locations. In various examples, some of the services 560 are accessible over the internet.

The mobile computing device may communicate with a personal computer 570. For example, the personal computer 570 may be the home computer for a user of the mobile computing device 510. Thus, the user may be able to stream media from his personal computer 570. The user may also view the file structure of his personal computer 570, and transmit selected documents between the computerized devices.

The mobile computing device 510 may communicate with a social network 574. The social network may include numerous members, some of which have agreed to be related as acquaintances. Application programs on the mobile computing device 510 may access the social network 574 to retrieve information based on the acquaintances of the user of the mobile computing device. For example, an "address book" application program may retrieve telephone numbers for the user's acquaintances. In various examples, content may be delivered to the mobile computing device 510 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 510 may access a personal set of contacts 576 through network 550. Each contact may identify an individual and include information about that individual (e.g., a phone number, an email address, and a birthday). Because the set of contacts is hosted remotely to the mobile computing device 510, the user may access and maintain the contacts 576 across several devices as a common set of contacts.

The mobile computing device 510 may access cloud-based application programs 578. Cloud-computing provides application programs (e.g., a word processor or an email program)

that are hosted remotely from the mobile computing device 510, and may be accessed by the device 510 using a web browser or a dedicated program.

Mapping service 580 can provide the mobile computing device 510 with street maps, route planning information, and satellite images. The mapping service 580 may also receive queries and return location-specific results. For example, the mobile computing device 510 may send an estimated location of the mobile computing device and a user-entered query for "pizza places" to the mapping service 580. The mapping service 580 may return a street map with "markers" superimposed on the map that identify geographical locations of nearby "pizza places."

Turn-by-turn service 582 may provide the mobile computing device 510 with turn-by-turn directions to a user-supplied destination. For example, the turn-by-turn service 582 may stream to device 510 a street-level view of an estimated location of the device, along with data for providing audio commands and superimposing arrows that direct a user of the device 510 to the destination.

Various forms of streaming media 584 may be requested by the mobile computing device 510. For example, computing device 510 may request a stream for a pre-recorded video file, a live television program, or a live radio program.

A micro-blogging service 586 may receive from the mobile computing device 510 a user-input post that does not identify recipients of the post. The micro-blogging service 586 may disseminate the post to other members of the micro-blogging service 586 that agreed to subscribe to the user.

A search engine 588 may receive user-entered textual or verbal queries from the mobile computing device 510, determine a set of internet-accessible documents that are responsive to the query, and provide to the device 510 information to display a list of search results for the responsive documents. In examples where a verbal query is received, the voice recognition service 572 may translate the received audio into a textual query that is sent to the search engine.

These and other services may be implemented in a server system 590. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by a data processing apparatus, comprising:
   for each action of a set of actions, generating a training set of command sentences from a corresponding set of command sentences for the action, the generating the training set of command sentences including retaining first n-grams determined to be semantically relevant for the action and removing second n-grams that are determined to be semantically irrelevant for the action from each sentence in the corresponding set of command sentences for the action; and
   for each action, generating a command model from the training set of command sentences and persisting the command model in a computer memory device, the command model facilitating the generation of an action score for the action for an input sentence based on:
   the first n-grams determined to be semantically relevant for the action; and second n-grams for the action that are also second n-grams for all other actions.

2. The computer-implemented method of claim 1, wherein for each action, generating a training set of command sentences from the corresponding set of command sentences includes removing each n-gram from each sentence in the corresponding set of command sentences for the action that is not a first n-gram for the action.

3. The computer-implemented method of claim 1, wherein determining second n-grams in the set of command sentences that are semantically irrelevant for the action comprises:
    determining, for each action, corresponding candidate second n-grams that are semantically irrelevant for the action; and
    selecting the candidate second n-grams that are not first n-grams for any of the actions as the second n-grams.

4. The computer-implemented method of claim 1, wherein for each action, generating or updating a command model comprises generating a grammar rule model based on the first n-grams for the action.

5. The computer-implemented method of claim 1, wherein for each action, generation a command model comprises generating a statistical based model based on the first n-grams for the action.

6. The computer-implemented method of claim 1, wherein the command sentences are voice command sentences.

7. A system, comprising:
    a data processing apparatus and a computer storage apparatus in data communication with the data processing apparatus and storing instructions executable by the data processing apparatus and that upon such execution cause the data processing apparatus to perform operations comprising:
    for each action of a set of actions, generating a training set of command sentences from a corresponding set of command sentences for the action, the generating the training set of command sentences including retaining first n-grams determined to be semantically relevant for the action and removing second n-grams that are determined to be semantically irrelevant for the action from each sentence in the corresponding set of command sentences for the action; and
    for each action, generating a command model from the training set of command sentences and persisting the command model in a computer memory device, the command model facilitating the generation of an action score for the action for an input sentence based on:
        the first n-grams determined to be semantically relevant for the action; and
        second n-grams for the action that are also second n-grams for all other actions.

8. The system of claim 7, wherein for each action, generating a training set of command sentences from the corresponding set of command sentences includes removing each n-gram from each sentence in the corresponding set of command sentences for the action that is not a first n-gram for the action.

9. The system of claim 7, wherein determining second n-grams in the set of command sentences that are semantically irrelevant for the action comprises:
    determining, for each action, corresponding candidate second n-grams that are semantically irrelevant for the action; and
    selecting the candidate second n-grams that are not first n-grams for any of the actions as the second n-grams.

10. The system of claim 7, wherein for each action, generating or updating a command model comprises generating a grammar rule model based on the first n-grams for the action.

11. The system of claim 7, wherein for each action, generation a command model comprises generating a statistical based model based on the first n-grams for the action.

12. The system of claim 7, wherein the command sentences are voice command sentences.

13. The system of the claim 12, wherein for each action, generating a training set of command sentences from the corresponding set of command sentences includes removing each n-gram from each sentence in the corresponding set of command sentences for the action that is also not a first n-gram for the action.

14. The system of claim 12, wherein determining second n-grams in the set of command sentences that are semantically irrelevant for the action comprises:
    determining, for each action, corresponding candidate second n-grams that are semantically irrelevant for the action; and
    selecting the candidate second n-grams that are not first n-grams for any of the actions as the second n-grams.

15. The system of claim 9, wherein the command sentences are voice command sentences.

16. The system of claim 9, further comprising:
    a user device and a computer storage apparatus in data communication with the data processing apparatus and storing instructions executable by the data processing apparatus and that upon such execution cause the data processing apparatus to perform operations comprising:
    receiving from the data processing apparatus the command models for the action;
    receiving an input sentence of n-grams;
    applying the command models to the input sentence of n-grams to generate respective action scores;
    determining, from the command models, an action invoked by the input sentence based on the action scores, the action being one of the actions in the set of actions; and
    performing the action.

17. The system of claim 13, wherein:
    each command model is a grammar rule model; and
    applying the command models to the input sentence of n-grams comprises, for each grammar rule model, parsing the input sentence of n-grams.

18. The system of claim 13, wherein applying the command models to the input sentence of n-grams comprises, for each command model scoring the input sentence based, in part, on first n-grams that have been determined to be semantically relevant to the action and second n-grams that have been identified as being semantically irrelevant for all actions.

19. A non-transitory computer readable storage medium in data communication with the data processing apparatus and storing instructions executable by the data processing apparatus and upon such execution cause the data processing to perform operations comprising: accessing data specifying a set of actions, each action defining a user device operation that is different from user device operations for each other action;
    for each action of a set of actions, generating a training set of command sentences from a corresponding set of command sentences for the action, the generating the training set of command sentences including retaining first n-grams determined to be semantically relevant for the action and removing second n-grams that are determined to be semantically irrelevant for the action from each sentence in the corresponding set of command sentences for the action; and for each action, generating a command model from the training set of command sentences and persisting the command model in a computer memory device, the command model facilitating the generation of an action score for the action for an input sentence based on:
the first n-grams determined to be semantically relevant for the action; and
second n-grams for the action that are also second n-grams for all other actions.

* * * * *